A. H. NELSON & G. C. PETERSON.
WEEDER ATTACHMENT FOR CULTIVATORS.
APPLICATION FILED AUG. 24, 1915.

1,189,615.  Patented July 4, 1916.

Witnesses
W. C. Fielding
Henry T. Bright

Inventors
A. H. Nelson,
G. C. Peterson
By Chandler & Chandler
Attorneys

UNITED STATES PATENT OFFICE.

ALBERT H. NELSON AND GEORGE C. PETERSON, OF WHITE LAKE, SOUTH DAKOTA.

WEEDER ATTACHMENT FOR CULTIVATORS.

1,189,615.  Specification of Letters Patent.  Patented July 4, 1916.

Application filed August 24, 1915. Serial No. 47,089.

*To all whom it may concern:*

Be it known that we, ALBERT H. NELSON and GEORGE C. PETERSON, citizens of the United States, residing at White Lake, in the county of Aurora, State of South Dakota, have invented certain new and useful Improvements in Weeder Attachments for Cultivators; and we do hereby declare the following to be a full, clear, and exact description of the invention, such as will enable others skilled in the art to which it appertains to make and use the same.

This invention relates to weeder attachments for cultivators.

The object of the invention resides in the provision of an attachment of the type named particularly designed as an improvement on the attachment shown in U. S. Letters Patent No. 1,116,914 granted to us November 10, 1914, the present attachment differing from that shown in the patent referred to by providing means for yieldingly holding the rake in operative position and in certain details of construction that will hereinafter appear.

In describing the invention in detail reference will be had to the accompanying drawings wherein like characters of reference denote corresponding parts in the several views, and in which—

Figure 1:
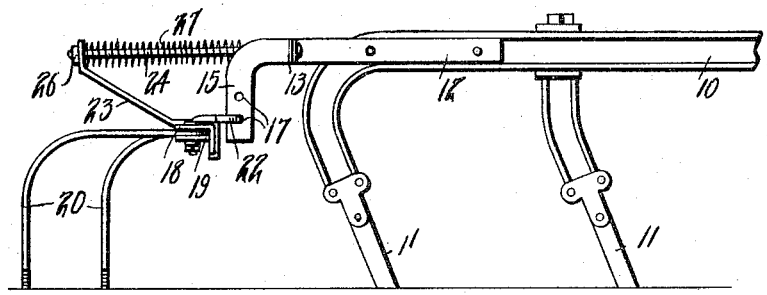
Figure 2:
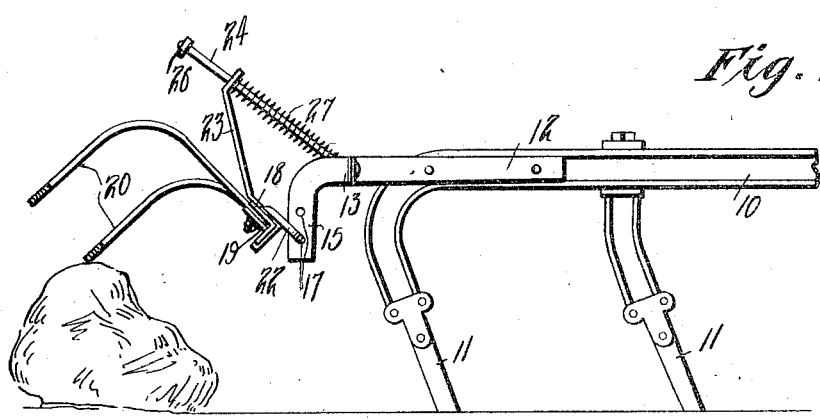
Figure 3:
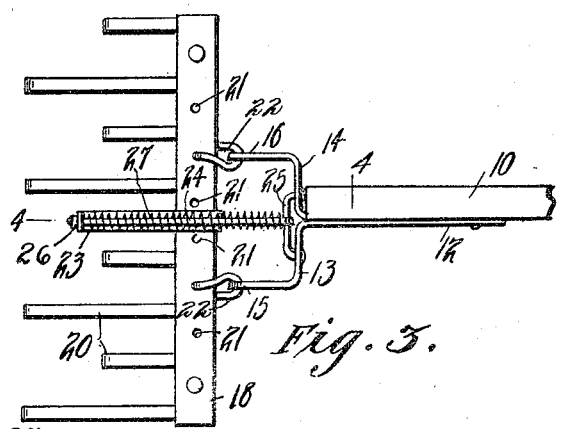
Figure 4:
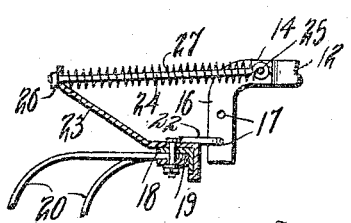

Figure 1 is a side elevation of a cultivator beam frame showing the improved attachment applied; Fig. 2, a view similar to Fig. 1 with the attachment in a vertically adjusted position; Fig. 3, a plan view of what is shown in Fig. 1, and Fig. 4, a section on the line 4—4 of Fig. 3.

Referring to the drawings 10 indicates a cultivator beam frame which is adapted to be attached to the wheeled frame of a cultivator in the usual and well known manner. Cultivator blades 11 are carried by the beam frame 10.

The improved attachment is shown as comprising a bar 12 which is secured to the beam frame 10 in any desirable manner. The rear end of the bar 12 terminates in lateral extensions 13 and 14 and the free ends of these extensions are carried rearwardly and downwardly to form arms 15 and 16 each of which is provided with a plurality of openings 17 for a purpose that will presently appear. The attachment further embodies a cross head 18 of angle iron to which is secured by means of a clamping plate 19 a plurality of suitable curved teeth 20. The cross head 18 and clamping plate 19 are provided with a plurality of openings 21 in which are adapted to be interchangeably engaged hook members 22 and these latter are also adapted to be interchangeably engaged in the openings 17 of respective arms 15 and 16. By interchangeably engaging the hook members 22 in the openings 21 it will be apparent that the cross head 18 and teeth 20 can be adjusted in a horizontal plane. It will be further apparent that by interchangeably engaging the hook members 22 in the openings 17 the head and teeth can be adjusted vertically with respect to the arms 15 and 16. Carried by the head 18 is an arm 23 through which is slidably engaged a rod 24, said rod being suitably pivoted at its forward end to a member 25 carried by the lateral extensions 13 and 14. The rear end of the rod 24 is bent laterally at 26 to limit the movement of the arm 23 thereon. Encircling the rod 24 is a spring 27 which bears at one end against the member 25 and at its other end against the arm 23, said spring serving to yieldingly hold the head 18 and teeth 20 in the position shown in Fig. 1. It will be noted that the hook members 22 form a pivotal connection with the arms 15 and 16 to permit swinging of the rake to the position shown in Fig. 2. It will be noted that the member 25 is of sufficient length to allow adjustment of the rake in a horizontal plane without interfering with the rod 24.

What is claimed is:—

1. A weeder attachment comprising a bar adapted to be secured to a cultivator beam and having its rear end terminating in spaced depending arms, a rake pivotally secured to said arms, and means for yieldingly holding said rake against pivotal movement.

2. A weeder attachment comprising a bar adapted to be secured to a cultivator beam and having its rear end terminating in spaced depending arms, a rake, and means for interchangeably and pivotally connecting the rake to said arms at different elevations with respect to the latter.

3. A weeder attachment comprising a bar adapted to be secured to a cultivator beam and having its rear end terminating in spaced depending arms, a rake, pivotally connected to said arms, an arm on the rake, a rod pivoted to said bar and slidably engaged through the arm on the rake, and a spring encircling said rod and normally holding the arm on the rake at the limit of its rearward movement.

In testimony whereof, we affix our signatures in the presence of two witnesses.

ALBERT H. NELSON.
GEORGE C. PETERSON.

Witnesses:
 PETER GOLUS,
 MATH STEICHEN.